Dec. 2, 1969 D. M. BORNARTH 3,481,734

PHOTOELECTROSTATIC RECORDING MEMBER USEFUL FOR CONTACT PHOTOPRINTING

Filed June 14, 1965

Inventor:
Dennis M. Bornarth
Sol L. Goldstein
Atty.

United States Patent Office 3,481,734
Patented Dec. 2, 1969

3,481,734

PHOTOELECTROSTATIC RECORDING MEMBER USEFUL FOR CONTACT PHOTOPRINTING

Dennis M. Bornarth, Palatine, Ill., assignor to Addressograph-Multigraph Corporation, Charles Bruning Division, Mount Prospect, Ill., a corporation of Delaware Filed June 14, 1965, Ser. No. 463,766
Int. Cl. G03g *5/08, 13/22*
U.S. Cl. 96—1 2 Claims

ABSTRACT OF THE DISCLOSURE

A translucent, zinc oxide containing photoelectrostatic member that can be utilized as a graphic original for the diazo process. The photoelectrostatic member requires a paper base support having proper electrical resistivity, a minimum of 40% light transmission and a minimum solvent holdout of 125 millimeters when measured by the falling drop test technique. The photoconductor is zinc oxide pigment dispersed in a resin binder with the range of pigment to binder being 2:1 to 10:1 and applied from a solvent system so that the coating weight range on a dry basis is from 5 pounds to 20 pounds per 3000 square feet.

Figure 1:
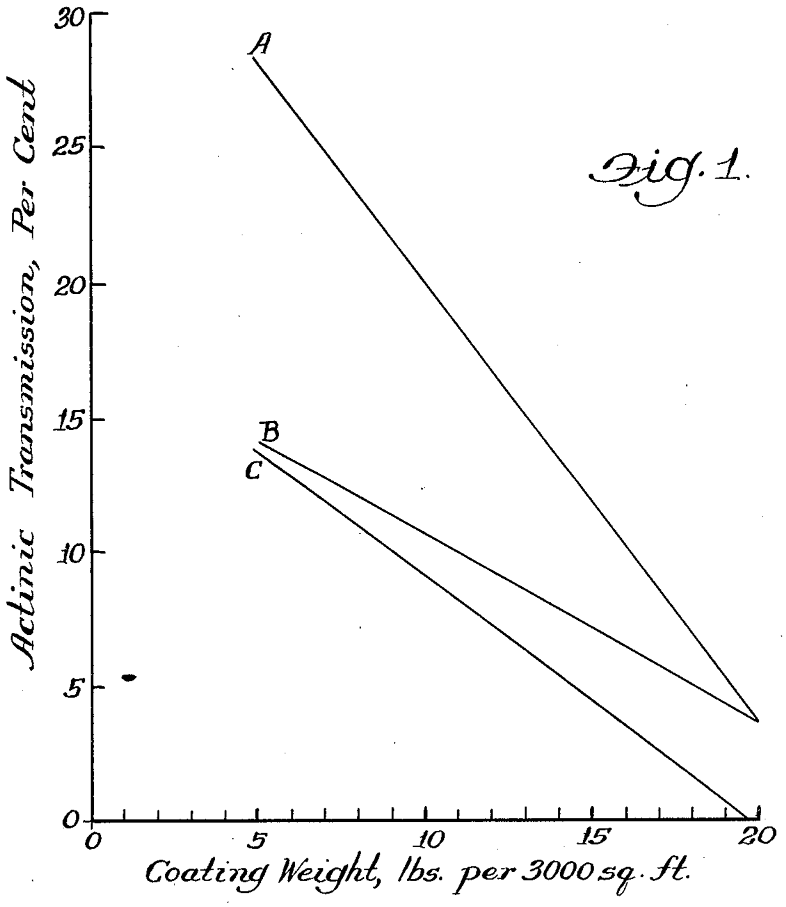

This invention relates to photoelectrostatic recording members and, more particularly, to improved photoelectrostatic recording members useful as originals for making diazotype reproductions.

Diazotype printing, which employs light sensitive diazotype materials, may be described as a contact exposure process in which the sensitized material is exposed to actinic radiation through a suitable graphic original that is superimposed onto the copying material. The areas of the sensitized materials protected from exposure to the actinic radiation by the opaque image portions of the superimposed original are later developed into an azo dye image with a suitable coupler. In those areas of the sensitized coating which are struck by the actinic radiation photo decomposition occurs preventing the diazonium salt from reacting with the coupler to form an azo dye.

This contact exposure process is limited to some extent by the nature of the graphic original. It must be sufficiently translucent so that the incident radiation gets through the non-image areas to expose the light sensitive diazo material corresponding to the non-image areas on the original. Accordingly, it will be appreciated that the translucent original can only be imaged on one side. These limitations restrict the type of originals that can be used in the contact exposure process. Despite the requirement of having to use a translucent original to make a diazo reproduction, it is a widely accepted process because of the high quality and low cost per copy. The inconvenience of having to work with a translucent original is more than compensated for in those instances where several copies of the original are required.

A large number of graphic originals prepared on base support materials do not readily transmit actinic radiation, therefore, they cannot be reproduced by the diazo process. Formerly, multiple copies from such an opaque original, when required, had to be reproduced by more expensive processes. The advantage of the high quality, economical, diazo processes was not available.

With the now well established photoelectrostatic technique for copying, the instant invention makes it possible to regenerate opaque originals by reproducing the originals on a suitably translucent photoelectrostatic member usable with the diazo process. In the practice of photoelectrostatic copying the photoelectrostatic member, comprising a photoconductive insulating layer laid down on a suitably conductive base support, is electrostatically charged in the dark. The charged photoconductive layer is then exposed to a light pattern corresponding to light and dark areas on the original document. Exposure can be accomplished by projecting through a suitable optical system the light pattern of the original. Light causes the photoconductive insulating material, such as zinc oxide or selenium, to become electrically conducting and the charge in light struck areas is dissipated rapidly from the surface of the photoconductive layer to the conductive base support, the rate of charge dissipation being proportional to the intensity of light to which any given area is exposed. After such exposure, the surface of the photoconductive layer is contacted in the dark with electroscopic particles such as pigmented thermoplastic resins. The particles adhere to the photoconductive layer in the areas corresponding to the imaged portions of the original and may be fixed by heat or vapor fusing to form a permanent image. In this manner a reproduction of almost any type of original can be prepared.

Heretofore known photoelectrostatic recording members employing photoconductive particles, such as zinc oxide, dispersed in an insulating resin binder, did not meet the requirements necessary for use with diazo reproduction systems. These recording members, due to their high degree of opacity, failed to transmit sufficient quantity of actinic radiation and a light sensitive diazotype material could not be exposed therethrough. The base support material, usually paper, was of limited translucency. Upon this base support was then laid down a further opacifying layer of zinc oxide in an insulating resin binder. Prior attempts to render these recording members translucent, such as by employing base supports of thinner paper stock, or transparent plastic films; or by decreasing the thickness of the photoconductive insulating layer; or by changing the zinc oxide concentration in the photoconductive layer, resulted in interference with the electrostatic properties of the photoconductive member.

The use of a paper base support presents the problem of absorbing solutions of the resin binder into the base support proper. It is important that the film forming resin binder dissolved in a solvent or aqueous medium containing the photoconductor particles, remain on the surface of the base support experiencing a minimal amount of penetration of the resin solution into the support. Differential amounts of resin penetration, due to the variations of absorptivity of different areas of the fibrous support, result in the photoconductive layers having variable concentration ratios of photoconductive particles to resin binder. Such a non-uniform coating gives non-uniform reproduction.

It is the general object of the present invention to provide a photoelectrostatic recording member capable of functioning as an original for diazo copying or other contact printing methods.

It is another object of this invention to provide a photoelectrostatic member that can be imaged on conventional photoelectrostatic copying equipment generating a new original that can be used for preparing conventional diazo reproductions by the contact exposure process.

It is another object of this invention to provide a photoelectrostatic member that is sufficiently translucent so that it transmits actinic radiation and also can be imaged on conventional photoelectrostatic copying equipment.

It is still a further object of this invention to provide a process which effectively allows the preparation of diazo reproductions from opaque two-sided originals.

Other objects and advantages of this invention will be apparent from the following detailed description thereof.

In carrying out the objects of the invention, the base support material for the photoconductive layer is a critical component. It must be sufficiently thin and flexible, yet stiff enough to be processed through the copying equipment; have an electrical resistivity in the range of $10^6$ to $10^{16}$ ohm-cm., preferably a resistivity in the range of $10^8$–$10^{12}$ ohm-cm.; be suitably resistant to the penetration of the solvent vehicles in which are dispersed the photoconductive materials; and finally, transmit at least 40% and preferably more than 60% of the incident actinic radiation. A wide range of cellulosic materials can be used as well as transparent plastic films of sheets such as polyvinyl alcohol, polyvinyl acetate, polyvinyl chloride impregnated with glycol, polyvinyldene chloride, polycarbonate, and polyesters such as terephthalic acid-ethylene glycol and terephthalic acid-1,4 cyclohexanedimethanol, which have been treated to give the necessary conductivity. The preferred base support is a glassine type 100% rag content paper. Paper of similar type with no rag content or less rag content may also be employed as the base support.

The properties of a suitable base support for the photoelectrostatic member of this invention compared to known materials, are as follows:

| Properties | Paper of this Invention | Prior Art Paper |
|---|---|---|
| Physical: | | |
| Thickness, mils | 1.0–3.0 | 2.0–3.5 |
| Basis weight (17 x 22–500), lbs | 10–20 | 15–26 |
| Solvent penetration, mm | [1] 125 | 75 |
| Electrical: Resistivity (over the range of 80%–20% relative humidity), ohm-cm | $10^6$–$10^{12}$ | $10^{12}$–$10^{16}$ |
| Optical: Actinic transmission, percent | [1] 40 | 5–20 |

[1] Minimum.

The thickness or caliper measurements are made using conventional thickness measuring devices, as is the basis weight. Solvent penetration is measured by the "falling drop" test as described in Pulp and Paper, by J. P. Casey, vol. 3 (1961), page 1792. Actinic light transmission in the range of the spectrum isolated by Corning filter No. 5970 is measured with a densitometer of the type sold by the Photovolt Corporation, New York, identified as a Model 52 Electronic Transmission Densitometer.

The electrical resistivity of the base support material determines in large measures the conditions under which good quality photoelectrostatic copies can be made. The conductivity can be controlled by treating a base support, that meets the other requirements, with an alcoholic solution of sodium, lithium, potassium or ammonium hydroxide, as described in the copending application, Serial No. 307,946, now abandoned and assigned to the same assignee of the instant invention. The resistivity range of the support base for the photoelectrostatic members of this invention is critical particularly when the photoconductive layer is applied to a paper base whose resistivity varies with the humidity conditions. Prior art paper support bases having a resistivity in the range of $10^{12}$–$10^{16}$ ohm-cm., at a relative humidity of about 50%, would be highly resistive and give extremely poor performance. By comparison the resistivity of the preferred substrates at the same humidity would be more conductive, $10^8$ to $10^{10}$ ohm-cm. range. The effects of resistivity on the overall performance of the photoelectrostatic member over a range of humidity will be discussed hereinafter.

The requirement of the support base to resist penetration of the resin binder solution is essential in order that the photoconductive coating form a separate uniform layer on the surface of the support as opposed to being absorbed or partially absorbed into the support. In the circumstance where the coating soaks into the support the ratio of photoconductive pigment to insulating resin binder is upset thereby decreasing the speed of the photoconductive layer.

It is important that the support be flexible so that it can be processed through copying equipment and yet have sufficient rigidity to hold to the paper path as it is fed through the apparatus.

If the base support does not exhibit the proper amount of light transmission, it is not usable. To start with, the support alone must transmit radiation in excess of that required of the finished sheet since the photoconductive layer applied to the support tends to increase its opacity.

In the circumstance where the base support as manufactured lacks the necessary electrical properties and/or the solvent hold-out, it can be treated subsequently with suitable conductive and barrier coatings to meet these requirements. However, such further treatments, particularly the application of a barrier coating, complicate the manufacturing process of the photoelectrostatic member. In the instant invention, it has been found that highly calendered paper suitable as a support must transmit a minimum of 40% of the incident actinic radiation as measured on a calibrated densitometer before applying the photoconductive layer.

To the base support there is applied a photoconductive layer comprising finely divided photoconductive particles such as zinc oxide, zinc sulfide, antimony sulfide, zinc-cadmium sulfide, zinc-magnesium oxide, calcium-strontium sulfide, sulfur, or anthracene dispersed in an insulating resin binder. Suitable resin binders are: polystyrene; silicone resins manufactured by the Dow Corning Corporation; acrylic and methacrylic ester polymers supplied by Rohm and Haas under their trade name "Acryloid"; Du Pont's polymerized butyl methacrylates sold under the trade name "Lucite"; and chlorinated rubber available from Hercules Powder Company (Parlon); polyvinyl chloride and polyvinyl acetate available from the Bakelite Corporation; alkyd resins such as "Glyptal" manufactured by the General Electric Company.

Small quantities of dyes may be incorporated as photosensitizing agents which are fully disclosed in U.S. Patent 3,052,540.

In order for the photoelectrostatic member to possess both the proper photosensitivity and translucency, it is necessary that the photoconductive layer be applied within specified limits of coating weight and ratios of photoconductor particles to insulating resin binder. It has been found that the finished photoelectrostatic member must have a minimum actinic transmission of 5% in order to function as an original with the various grades of diazotype paper and reproducing equipment available.

It is generally known that certain characteristic properties of the photoelectrostatic member such as saturation voltage depends on the ratio of photoconductor particles to resin binder and also the thickness of the coating applied. The range of photoconductor zinc oxide to resin binder in the photoelectrostatic art can vary from 2:1 to 20:1, and the coating weight, on a dry basis, can range from 8 lbs. to 15 lbs. per 3000 square feet. In the circumstance where the photoelectrostatic member is to function as a translucent original the opacifying effect of the photoconductor particles limits the ratio of zinc oxide to binder as well as the amount of coating per given area of support base that can be applied.

Referring to FIGURE 1, there is shown the relationship between coating weight on a dry basis and the percent transmission at 2:1, 6:1 and 10:1 zinc oxide to binder ratios, identified as curves A, B and C, respectively. As the coating weight increases the general level of transmission decreases. However, greater coating weights can be applied by decreasing the ratio of zinc oxide to binder. As shown in curves A, B and C, a transmission greater than 5% is obtained when applying, on a dry basis, from 5 lbs. to 19 lbs. of photoconductive coating per 3,000 square feet, the preferred range being from 8 to 12 lbs. The corresponding ratio of photoconductive zinc oxide to insulating resin binder is in the range 2:1 to 10:1, the preferred ratio being in the range of 4:1 to 6:1.

As will be seen in FIGURE 1, at a 2:1 zinc oxide to binder ratio, curve A, the coating weight can go as high as 19 lbs. per 3,000 square feet and at 10:1, curve C, the opacifying effect of zinc oxide is such that the coating weight limit is about 14 lbs. per 3,000 square feet.

As has been stated earlier, the photoelectrostatic member must have the necessary photosensitivity in order that it be imaged by the electrostatic copying process. The photosensitivity is dependent on the zinc oxide-binder ratio and the coating weight. The photosensitvity, S, as used herein, is defined as the amount of light necessary to completely discharge a photoelectrostatic member, i.e., from a saturation voltage of at least 250 volts to zero potential, expressed as the reciprocal of foot-candle-seconds.

Figure 2:
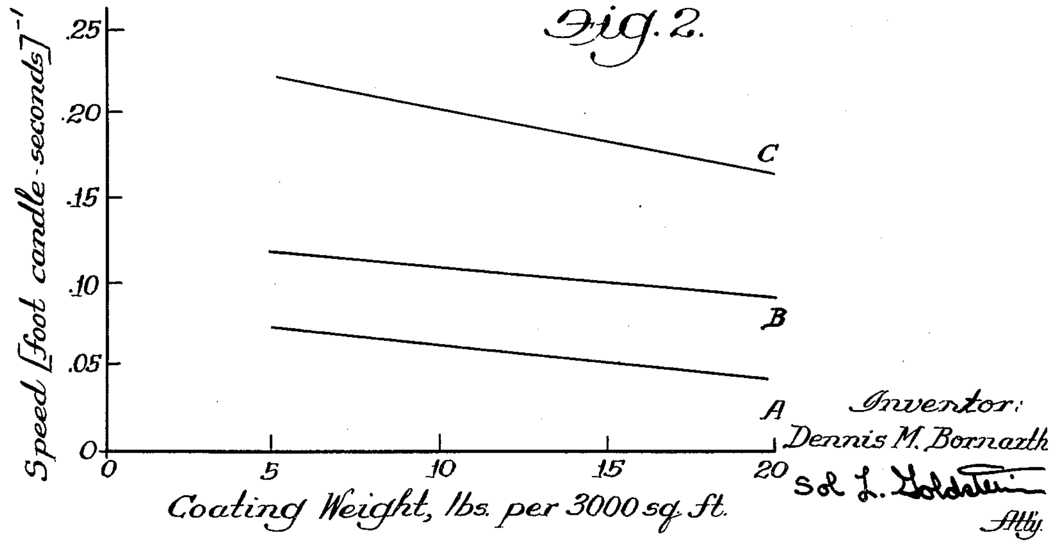

In FIGURE 2, there is shown the relationship between the photosensitivity, S, over the coating weight range for the three ratios of zinc oxide to binder, as identified in FIGURE 1. It has been found that a value of S less than 0.04 (f.c.s.)$^{-1}$ results in a photoelectrostatic member that is too slow for most commercial office copying equipment. Referring to curve A of FIGURE 2, a zinc oxide to binder ratio of 2:1 coated at the rate of 19 lbs. per 3,000 square feet will have the minimum acceptable photosensitivity of 0.04 (f.c.s.)$^{-1}$. At increased pigment to binder ratios the photosensitivity increases as shown in curve B. In the preferred range of 4:1 to 6:1, the photosensitivity ranges from .07–.11 (f.c.s.)$^{-1}$ and the saturation voltage level would be 400–500 volts.

The present invention is further illustrated by the following examples, in which all parts are by weight unless otherwise specified.

EXAMPLE I

A translucent photoelectrostatic member was prepared using zinc oxide photoconductive particles dispersed in an insulating resin binder on a suitable base support as follows:

The base support having the following properties was used as the starting material.

| | | |
|---|---|---|
| Basis weight, 500 sheets 17" x 22" | lbs | 15.0 |
| Caliper | mils | 1.9 |
| Resistivity | ohm-cm | $1.5\times10^8$ |
| Actinic transmission | percent | 63 |
| Solvent penetration | mm | 200 |

The above measurements of the base support are accomplished using procedures well known in paper technology. Actinic transmission is a measure of the shielding effect of the base support to the passage of actinic radiation, as determined with the Photovolt densitometer. Solvent penetration is measured by the "falling drop" procedure described in Pulp and Paper, 2nd edition (1961), volume 3, page 1792.

Zinc oxide, photoconductor grade, available from the American Zinc Company, was mixed with Dow Corning silicone resin DC–801 in the weight ratio of 5 parts photoconductor to one part resin and 6 parts of toluene. The finely divided zinc oxide, binder material and toluene were milled together to disperse the photoconductor in the coating slurry. The resulting dispersion was uniformly applied to a continuous web of the support base at the rate of 10 lbs. per 3,000 square feet by means of a wire-wound coating bar or other suitable coating equipment. The web was then passed through a drying oven where residual solvent was evaporated and the resin binder polymerization was initiated by the action of heat to form a uniform continuous film.

Individual cut sheets were examined to determine the translucent property expressed in terms of the percent transmission of actinic radiation. In the instant example, the actinic transmission measured 14% for the zinc oxide coated base support.

The photoelectrostatic member thus prepared was utilized to make a reproduction of a two-sided original by electrostatically charging, in the dark, the photoconductive layer and projecting thereon a light pattern of one side of the original desired to be reproduced. This was accomplished on a conventional photoelectrostatic copying machine. The finished electrostatic copy comprised a permanent image fixed on the translucent support base. Next, this electrostatic copy was placed over a sheet of diazo printing paper and passed through a diazo copying machine after the exposure control was adjusted to give the proper amount of actinic radiation.

Attempts to apply the coating formulation to a 13 lb. bond paper resulted in an unevenly coated photoelectrostatic member having a photosensitivity below 0.04 (f.c.s.)$^{-1}$. Increasing the zinc oxide to binder ratio to 10:1 cut the actinic transmission to less than 5%.

In the instant example, a "Copyflex" Model 675 copier manufactured by the Bruning Division of Addressograph-Multigraph Corporation was used to make a completely acceptable diazo reproduction of one side of the two-sided original by utilizing the photoelectrostatic copy as the master for the diazo exposure. The photoelectrostatic member was reusable as an original for making many additional diazo copies.

EXAMPLE II

A paper having the following characteristics was used as a base support:

| | | |
|---|---|---|
| Thickness | mils | 2.1 |
| Basis weight | lbs | 16.8 |
| Solvent penetration | mm | 189 |
| Resistivity | ohm-cm | $5.0\times10^{11}$ |
| Actinic transmission | percent | 50 |

A photoconductive coating comprising zinc oxide dispersed in an insulating resin binder in the ratio of 6:1 was applied at a rate of 12 lbs. per 3,000 square feet. The resulting photoelectrostatic member had an actinic transmission of 8.9%, and a photosensitivity of about 0.13 (f.c.s.)$^{-1}$.

EXAMPLE III

A photoelectrostatic member was prepared using a base support having the following characteristics:

| | | |
|---|---|---|
| Thickness | mils | 2.1 |
| Basis weight | lbs | 16.0 |
| Solvent penetration | mm | 194 |
| Resistivity | ohm-cm | $2.7\times10^{11}$ |
| Actinic transmission | percent | 53 |

A photoconductive coating formulated in accordance with the description of Example I was applied to the base support. In the instant example the zinc oxide-binder ratio was 6:1 and applied at a rate of 13 lbs. per 3,000 square feet. The photoelectrostatic member of this invention performed well as an intermediate translucent master for making a diazo print. The actinic transmission of 8.8% was somewhat less than the lighter weight coating of Example I which had a smaller ratio of zinc oxide to binder. Hence, the diazo print paper when used with the original of this example required a longer exposure than the photoelectrostatic member of Example I.

EXAMPLE IV

To the base support stock of Example I there was applied a photoconductive layer with a formulation similar to Example II with the exception that it was applied at the rate of 12 lbs. per 3,000 square feet on a dry basis. The finished photoelectrostatic paper gave excellent electrostatic copying performance and exhibited an actinic transmission of 8.7%.

EXAMPLE V

A photoelectrostatic member was prepared in accordance with the procedure described in Example I with the exception that a 10:1 zinc oxide to binder coating formulation was applied at a rate of 6 lbs. per 3,000 square feet. The actinic transmission of the finished sheet measured 12.5% and it had a photosensitivity of about 0.21 (f.c.s.)$^{-1}$ and saturation voltage level of 300 volts. While such a photoelectrostatic member possesses good transmission characteristics, the lower coating weight necessary to achieve this transmission resulted in some sacrifice of the density of the electrostatic image due to the lower saturation voltage level.

It should be pointed out that the resistivity of the base support must fall within the critical range of $10^6$–$10^{12}$ ohm-cm. At resistivities greater than $10^{12}$ it becomes extremely difficult to impart a high enough charge (saturation voltage level), and at a resistivity lower than $10^6$ ohm-cm. much too slow a photosensitivity occurs. Since the resistivity is affected by the moisture content of the paper base, a range of $10^6$–$10^{12}$ ohm-cm. corresponding to a range of 80% to 20% relative humidity in the working environment is required.

As discussed above, the starting base support must have an actinic transmission of at least 50% prior to coating with the photoconductive layer, preferably greater than 60%, in order that the finished photoelectrostatic member will have an actinic transmission of at least 5%. Actinic transmission values below 5% are not functional with even the fastest printing diazo print papers commercially available.

The photoelectrostatic member of this invention makes it possible to utilize the diazo copying process in conjunction with the photoelectrostatic copying process offering the following advantages.

(1) Multiple copies can be made at a decrease in cost per copy by utilizing the inexpensive diazo process.

(2) Diazo copies of graphic originals containing intelligence on both sides can be prepared.

(3) The imaged photoelectrostatic member can be used directly without the use of special transparentizing solutions.

(4) The photoelectrostatic original is a permanent reusable original.

The invention has been described in detail with particular reference to preferred embodiments thereof, but it will be understood that variations and modifications can be effected within the spirit and scope of the invention as described hereinabove and as defined in the appended claims.

What is claimed as the invention and desired to be secured by Letters Patent of the United States is:

1. The process of reproducing a graphic original on a first light sensitive diazotype material comprising the steps of (A) preparing a first reproduction of said original on a second photoelectrostatic member capable of being used for successive exposures comprising, (i) a flexible paper support having the following properties:

(a) thickness 1–3 mils (b) conductivity $10^6$–$10^{12}$ ohm-centimeters (c) solvent holdout (minimum) 125 millimeters (d) actinic transmission 40%;

(ii) a photoconductive coating applied to said base support having the following properties:

(a) ratio by weight of inorganic photoconductive pigment to resin binder 2:1–10:1

(b) coating weight in pounds per 3000 square feet of base support (dry base) 5–20 pounds;

(B) exposing said first diazotype material to actinic radiation through said first reproduction to produce a latent diazo image thereon, (C) developing said latent diazo image to produce a second reproduction, said first reproduction having opaque image portions and non-image portions, said non-image portions having an actinic transmission of at least 5% whereby said non-image portions are capable of transmitting sufficient quantities of actinic radiation incident to said first member to decompose the light sensitive diazo coating thereon.

2. The process described in claim 1 wherein the finely divided photoconductive particles are zinc oxide.

References Cited

UNITED STATES PATENTS

| | | | |
|---|---|---|---|
| 2,346,670 | 4/1944 | Engler et al. | 204—2 |
| 2,857,271 | 10/1958 | Sugarman | 96—1 |
| 2,999,750 | 9/1961 | Miller et al. | 96—1 |
| 3,274,000 | 9/1966 | Noe et al. | 96—1.5 |
| 2,939,787 | 6/1960 | Giaimo | 96—1 |
| 2,959,481 | 10/1960 | Kucera | 96—1 |
| 3,138,458 | 6/1964 | Kimble et al. | 96—1 |
| 3,245,786 | 4/1966 | Cassiers | 96—1 |
| 3,313,626 | 4/1967 | Whitney | 96—33 |

FOREIGN PATENTS 1,109,033 6/1961 Germany.

OTHER REFERENCES

The Dictionary of Paper, 2nd ed., Am. Paper & Pulp Assn., New York, N.Y., 1951, p. 186.

GEORGE F. LESMES, Primary Examiner

J. C. COOPER III, Assistant Examiner

U.S. Cl. X.R.

96—49